G. W. CONOLLY.
Cultivator.
No. 43,671.                      Patented Aug. 2, 1864.
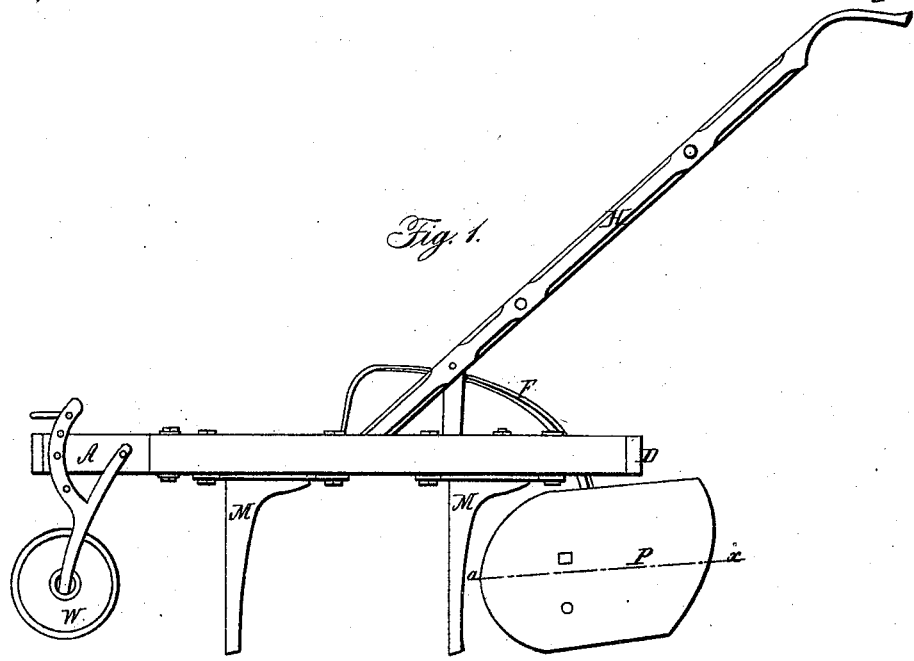
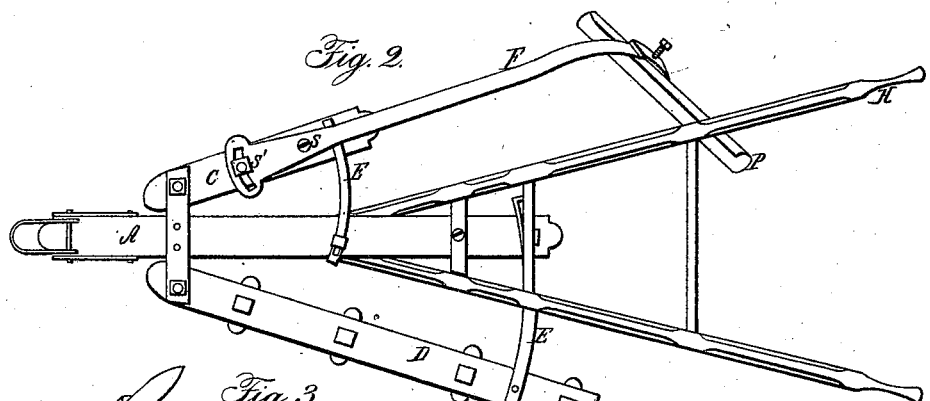
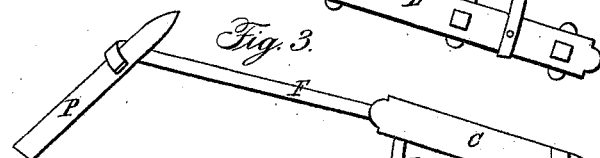
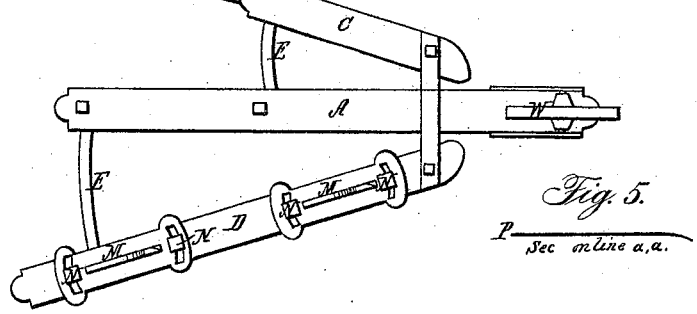
Witnesses:                          Inventor:

UNITED STATES PATENT OFFICE.

GEORGE W. CONOLLY, OF ROCHESTER, NEW YORK.

IMPROVEMENT IN CULTIVATORS.

Specification forming part of Letters Patent No. 43,671, dated August 2, 1864; antedated July 20, 1864.

*To all whom it may concern:*

Be it known that I, GEORGE W. CONOLLY, of the city of Rochester, in the county of Monroe and State of New York, have invented a certain new and useful Improvement in Horse-Hoes; and I do hereby declare the following to be a full and accurate description of the same, reference being had to the accompanying drawings, making part of this specification, and to the letters of reference marked thereon, same letters referring to like parts in all the figures.

Of said drawings, Figure 1 is a side elevation of my improved implement. Fig. 2 is a plan of the same in its proper position. Fig. 3 is a plan of the same in a position reverse to that shown in Fig. 2. Figs. 4 and 5 are detail drawings explanatory of the formation of various parts.

The nature of this invention consists in so combining and arranging the several parts that while the implement shall cut the soil with only one cutter, plow, or shovel, and thus collect and discharge the surface-soil, weeds, &c., in a continuous ridge in the center of the row, it may be easily guided and directed, thus avoiding all danger of injuring the young trees or plants, and allowing the operator to approach so close to them that very little work shall be left for the hand-hoe.

In the drawings, Figs. 1, 2, and 3, A is a stout beam, to which is attached the adjustable wheel W, for regulating the depth of cut, and having the handles H H attached, as shown. To this beam are hinged the two beams C and D, which are readily adjustable as to width or spread by means of the arcs E E in a well-known manner. The wing or beam C carries the arm F, which is attached to it by means of the screws S and S', the screw S passing through a simple hole, while the screw S' passes through a slot, thus giving a further power of adjustment to the plow or shovel P, which is attached to the arm F, as shown in detail in Fig. 4. This plow or shovel consists of a curved metallic plate, and by the means above described it is adjustable either as to width or spread, or in regard to the angle which it makes with the direction of the rows.

As the character of the soil also exercises a material influence on the working of the implement, I have provided means whereby the angle which the plow makes with the surface of the soil may be varied so as to suit the ground which is being cultivated. To this end I attach the plow to the bar or arm F by means of the bolts *b b'* and set-screw *e*, so that by loosening or tightening the bolt *b* and turning the set-screw *e* to correspond the angle which the plow forms vertically may be changed at pleasure. The plow P is also rounded at the mouth, partly to facilitate its working and partly to prevent its injuring the roots which spring just below the collar of the tree or plant, and as it is smooth and free from all projection the surface-soil and weeds which it removes pass easily along it and are discharged in a continuous ridge. It is also relieved or cut away slightly behind the entering-point, so that it may have no tendency to slide over the land. This relief is fully shown in Fig. 1.

The whole implement is designed to be drawn through the rows by a horse or other animal, and to be guided by a man; but it will be readily seen that if the plow consisted of a metal plate curved in only one direction it would, if left to itself, have a continual tendency to move, not in the direction of the rows, but in the direction of its own axis. Hence it would be impossible to keep it from running against the trees, except by constant readjustment, which would of course involve the necessity of skipping a portion of the land. Partly to counteract this tendency, and partly to facilitate the cutting of the soil and the turning of the implement in the furrow, I form the mouth of the plow of a cup shape, as shown in Figs. 5 and 1—that is to say, instead of the plate of metal of which the plow is formed being simply a segment of a tube, it is recurved at the mouth, so that the cutting portion forms a different angle with the line of motion from what the rest of the plow does. As a further means of guiding the implement, the beam or wing D carries two guides which descend into the soil, and are so beveled as to have a tendency directly the opposite of that belonging to the plow. These guides are formed as seen in Fig. 3, and with a cross-section, the same as there seen. They are so attached to the beam D that they may be set to any angle, the beam itself being capable of adjustment to any width, as previously described. The mode of so adjusting the guides will be readily understood from Fig. 3, where it will be seen that the bolts N N pass through slots in the head of the guide, so as to allow it to be slightly turned and then to secure it in the required position. These guides will of course act the more powerfully the more deeply they are inserted in the ground, and hence by bearing more or less heavily upon the left handle of the implement the operator can guide the machine in any direction which he chooses, at the same time allowing it to retain a constant and equable motion without skipping or sudden rectification.

Having thus described my invention, what I claim therein as new, and desire to secure by Letters Patent, is—

The combination of the adjustable plow P with the guides M M, said guides being constructed and arranged in the manner and for the purpose substantially as described.

G. W. CONOLLY.

Witnesses:
JOHN PHIN,
THOS. JONES.